United States Patent
Tsai et al.

(10) Patent No.: US 12,118,714 B2
(45) Date of Patent: Oct. 15, 2024

(54) METHOD OF DETECTING AND CLASSIFYING DEFECTS AND ELECTRONIC DEVICE USING THE SAME

(71) Applicant: HON HAI PRECISION INDUSTRY CO., LTD., New Taipei (TW)

(72) Inventors: Tung-Tso Tsai, New Taipei (TW); Tzu-Chen Lin, New Taipei (TW); Chin-Pin Kuo, New Taipei (TW); Shih-Chao Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 416 days.

(21) Appl. No.: 17/566,159

(22) Filed: Dec. 30, 2021

(65) Prior Publication Data
US 2022/0207687 A1 Jun. 30, 2022

(30) Foreign Application Priority Data
Dec. 31, 2020 (CN) .......................... 202011633792.8

(51) Int. Cl.
G06T 7/00 (2017.01)
(52) U.S. Cl.
CPC .... *G06T 7/001* (2013.01); *G06T 2207/20081* (2013.01); *G06T 2207/30108* (2013.01)
(58) Field of Classification Search
None
See application file for complete search history.

(56) References Cited

FOREIGN PATENT DOCUMENTS

| CN | 107483935 | | 12/2017 | |
|---|---|---|---|---|
| CN | 109614905 A | * | 4/2019 | ......... G06K 9/00536 |
| CN | 110378869 A | * | 10/2019 | ........... G06T 7/0004 |
| CN | 110554047 A | * | 12/2019 | ............. G01N 21/01 |
| CN | 110796637 A | * | 2/2020 | |
| CN | 110940672 A | * | 3/2020 | |
| CN | 109977808 B | * | 10/2020 | |

OTHER PUBLICATIONS

Dor Bank, Noam Koenigstein, Raja Giryes, "Autoencoders", arXiv:2003.05991v2 [cs.LG] Apr. 3, 2021.*
N. Shah and A. Ganatra, "Comparative Study of Autoencoders—Its Types and Application," 2022 6th International Conference on Electronics, Communication and Aerospace Technology, Coimbatore, India, 2022, pp. 175-180, doi: 10.1109/ICECA55336.2022.10009387.*

* cited by examiner

*Primary Examiner* — Jiangeng Sun
(74) *Attorney, Agent, or Firm* — ScienBiziP, P.C.

(57) ABSTRACT

A method applied in an electronic device for detecting and classifying apparent defects in images of products inputs an image to a trained autoencoder to obtain a reconstructed image, determines whether the image reveals defects based on a defect criterion for filtering out small noise reconstruction errors. If so revealed, the electronic device calculates a plurality of structural similarity values between the image and a plurality of template images with marked defect categories, determines a target defect category corresponding to the highest structural similarity value, and classifies the defect revealed in the image into the target defect category.

17 Claims, 3 Drawing Sheets

METHOD OF DETECTING AND CLASSIFYING DEFECTS AND ELECTRONIC DEVICE USING THE SAME

CROSS-REFERENCE TO RELATED APPLICATIONS

This application claims priority to Chinese Patent Application No. 202011633792.8 filed on Dec. 31, 2020, the contents of which are incorporated by reference herein.

FIELD

The subject matter herein generally relates to a field of image processing, and especially relates to a method of detecting and classifying defects, and an electronic device.

BACKGROUND

For quality in industrial products, a defect detection process is executed before packaging the industrial product. However, the current defect detection method can not automatically detect defects before the products are packaged.

BRIEF DESCRIPTION OF THE DRAWINGS

Implementations of the present disclosure will now be described, by way of embodiment, with reference to the attached figures.

DETAILED DESCRIPTION

Figure 1:
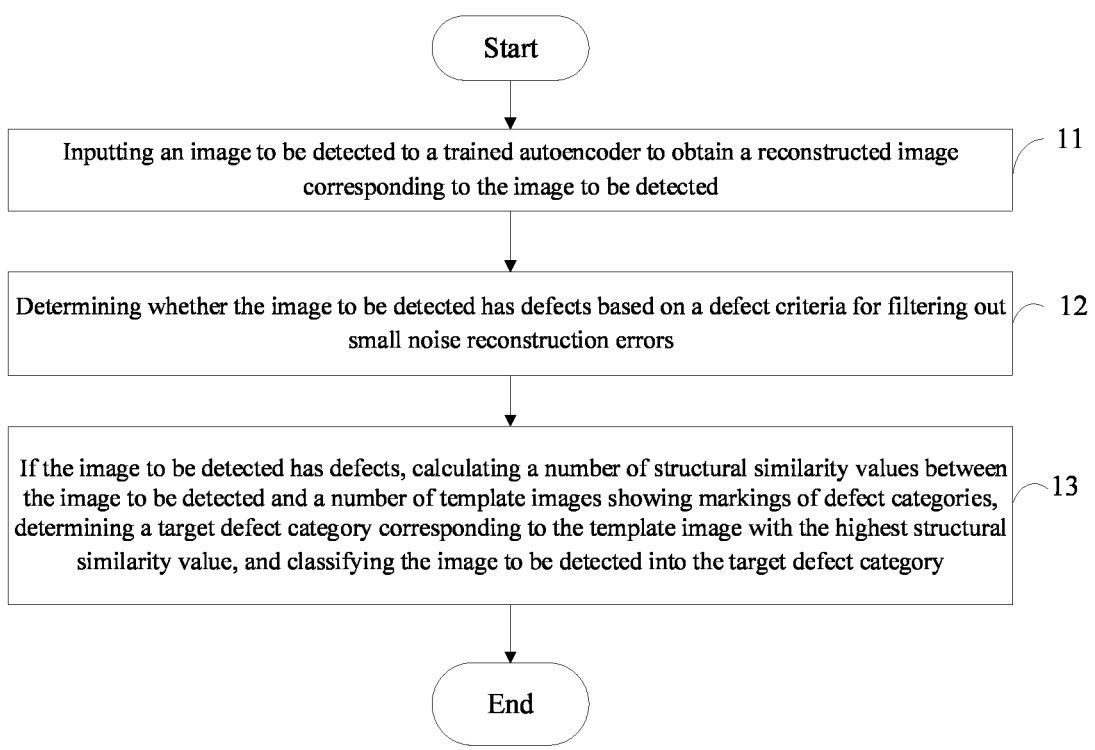
FIG. 1 is a flowchart of one embodiment of a method for detecting and classifying defects.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for detecting and classifying defects is illustrated in the disclosure. The method is applied in one or more electronic devices. The electronic can process data according to a number of preset or stored instructions. The hardware of the electronic device includes, but is not limited to, a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server or other computing devices. The device can carry out a human-computer interaction with user by a keyboard, a mouse, a remote controller, a touch pad, or a voice control device.

FIG. 1 illustrates the method for detecting and classifying defects. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, inputting an image of a product ("image to be detected") to a trained autoencoder, and obtaining a reconstructed image corresponding to the image to be detected.

In one embodiment, the autoencoder can be trained by using images in a training set. The images in a training set can be images of flawless samples. In one embodiment, the autoencoder can be trained by an optimization objective function. The optimization objective function can be $|X-X'|_1 + \lambda |X-X'|_2$, wherein X is the image to be detected, X' is the reconstructed image, $\lambda$ is a weight with a value range of 0.1-10, $|X-X'|_1$ is an L1 norm of a reconstructed error image between the image and the reconstructed image, and $|X-X'|_2$ is L2 norm of the reconstruction error image.

In one embodiment, the optimization objective function ensures the sparsity of the reconstructed error image as much as possible, and also ensures the smoothness of the reconstructed error image. As to the weight of the optimization objective function, a balance between smoothness and sparsity of the reconstructed error image from the autoencoder is realized by giving $\lambda$ different values. The larger the value of $\lambda$, the smoother will be the reconstructed error image. The smaller the value of $\lambda$, the more sparse will be the reconstructed error image. In one embodiment, the general value range of $\lambda$ is 0.1 to 10.

In one embodiment, a preset reconstruction error measurement threshold is $\tau$. $\tau$ is a statistical value of a reconstruction error corresponding to the reconstructed error image by the autoencoder training the reconstruction error, and the $\tau$ is adjusted based on a recall rate of a preset defect detection and an accuracy rate of the preset defect detection. The accuracy rate is the number of the images correctly detected as defective as a proportion of the number of all images detected as defective. The recall rate is the number of the images correctly detected as defective as a proportion of the number of all images showing real defects. For example, if the reconstruction error of the trained image by the autoencoder obeys the Gaussian distribution, the 85% quantile value of the Gaussian distribution can be used as the preset reconstruction error measurement threshold.

At block 12, determining whether the image to be detected has defects based on a defect criteria for filtering out small noise reconstruction errors.

In one embodiment, the electronic device 6 calculates the reconstruction error image according to the reconstructed image and the image to be detected. The electronic device 6 calculates a binary image of the reconstruction error image according to a binary image calculation formula for filtering out small noise reconstruction errors. In one embodiment, the binary image calculation formula can be $$\delta X_{i,j} = \begin{cases} 1 & \Delta X_{i,j} > \varepsilon \\ 0 & \text{otherwise} \end{cases},$$

wherein $\varepsilon$ is a filtering threshold of small noise reconstruction error, and $\varepsilon$ is determined by the autoencoder calculating the reconstruction error of the images in the training set. $\varepsilon$ is used to filter out pixels with the small reconstruction error, $\Delta X_{i,j}$ is the reconstruction error image between the image to be detected and the reconstructed image, and i and j represent pixel positions. $\delta X_{i,j}$ is the binary image of the reconstruction error image, and $\delta X_{i,j}$ is used to indicate the position of pixel with the larger reconstruction error. The electronic device 6 calculates an average value of the pixels with the large reconstruction error, and takes the average value of the pixels with the large reconstruction error as a measurement of the defect criteria according to the reconstruction error image and the binary image.

In one embodiment, the electronic device 6 detects the defect in the image by the defect criteria for filtering out small noise reconstruction errors. In one embodiment, a mathematical expression of the defect criteria can be $$\frac{\sum_{i,j} \Delta X_{i,j} * \delta X_{i,j}}{\sum_{i,j} \delta X_{i,j}} > \tau.$$

In one embodiment, if the image to be detected complies with the defect criterion for filtering out small noise reconstruction error, the electronic device 6 determines that the image to be detected does in fact have defects. If the image to be detected does not comply with the defect criterion, the electronic device 6 determines that the image to be detected reveals no defect.

At block 13, if the image to be detected has defects, calculating a number of structural similarity values between the image to be detected and a number of template images showing markings of defect categories, determining a target defect category corresponding to the template image with the highest structural similarity value, and classifying the image to be detected into the target defect category.

In one embodiment, the electronic device 6 calculates the structural similarity values between the image to be detected and the number of template images marking defect categories respectively according to $SSIM(x,y)=[l(x,y)]^\alpha [c(x,y)]^\beta [s(x,y)]^\gamma$, wherein $$l(x, y) = \frac{2\mu_x\mu_y + C_1}{\mu_x^2 + \mu_y^2 + C_1}, c(x, y) = \frac{2\sigma_x\sigma_y + C_2}{\sigma_x^2 + \sigma_y^2 + C_2}, s(x, y) = \frac{2\sigma_{xy} + C_3}{\sigma_x\sigma_y + C_3},$$

where x is the image to be detected, y is the template image, and SSIM(x,y) is the structural similarity values between the image to be detected and the template image. l(x,y) is used to compare a brightness of x with a brightness of y, $\mu_x$, $\mu_y$ represent an image mean of x and an image mean of y, and c(x,y) is used to compare an image contrast of x with an image contrast of y. $\sigma_x$, $\sigma_y$ represent an image standard deviation of x and an image standard deviation of y, $\sigma_{xy}$ is an image covariance between x and y, and $C_1$, $C_2$, $C_3$ are constants, and are used to maintain stability of l(x,y), c(x,y), s(x,y). For example, $C_1$ can be 1, $C_2$ can be 0.5, $C_3$ can be 0.5.

In one embodiment, the structural similarity value of the image to be detected and the template image is positively correlated with the similarity between the image to be detected and the template image.

In the present disclosure, the electronic device 6 trains the autoencoder to reconstruct the image to be detected to obtain the reconstructed image corresponding to the image to be detected, determines whether the image to be detected reveals defects according to the defect criterion for filtering out small noise, and classifies the image to be detected according to the structural similarity, thus improving the efficiency of defect detection and classification of the image.

Figure 2:
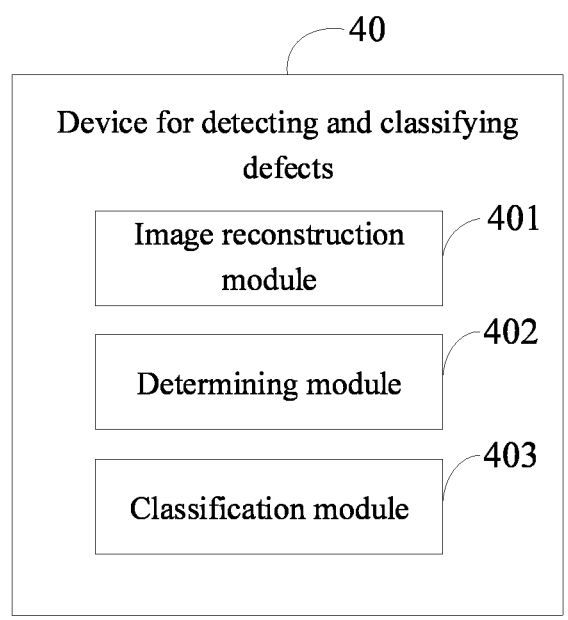
FIG. 2 is a block diagram of one embodiment of a device for detecting and classifying defects.

FIG. 2 illustrates a device 40 for detecting and classifying defects. The device 40 is applied in the electronic device 6. In one embodiment, according to the functions it performs, the device 40 can be divided into a plurality of functional modules. The functional modules perform the blocks 11-13 in the embodiment of FIG. 1 to perform the functions of defect detection and classification.

In one embodiment, the device 40 includes, but is not limited to, an image reconstruction module 401, a determining module 402, and a classification module 403. The modules 401-403 of the device 40 can be collections of software instructions. In one embodiment, the program code of each program segment in the software instructions can be stored and executed by at least one processor to perform the function of defect detection and classification.

The image reconstruction module 401 inputs an image to be detected to a trained autoencoder, and obtains a reconstructed image corresponding to the image to be detected.

In one embodiment, the autoencoder can be trained by using images in a training set. The images in a training set can be images of flawless samples. In one embodiment, the autoencoder can be trained by an optimization objective function. The optimization objective function can be $|X-X'|_1 + \lambda |X-X'|_2$, wherein X is an input image, X' is the reconstructed image, $\lambda$ is a weighting with a value range of 0.1-10, $|X-X'|_1$ is an L1 norm of a reconstructed error image between the image and the reconstructed image, and $|X-X'|_2$ is L2 norm of the reconstruction error image.

In one embodiment, the optimization objective function not only ensures the sparsity of the reconstructed error image as much as possible, but also ensures the smoothness of the reconstructed error image. As the weight of the optimization objective function, a balance between smoothness and sparsity of the reconstructed error image from the autoencoder is realized by giving $\lambda$ different values. The larger the value of $\lambda$, the smoother will be the reconstructed error image. The smaller the value of $\lambda$, the more sparse will be the reconstructed error image. In one embodiment, the general value range of $\lambda$ is 0.1 to 10.

In one embodiment, a preset reconstruction error measurement threshold is $\tau$. $\tau$ is a statistical value of a reconstruction error corresponding to the reconstructed error image by the autoencoder training the reconstruction error, and the T is adjusted based on a recall rate of a preset defect detection and an accuracy rate of the preset defect detection. The accuracy rate is the number of the images correctly detected as showing defective as a proportion of the number of all images of defects. The recall rate is the number of the images correctly detected as defective as a proportion of the number of all images showing real defects. For example, if the reconstruction error of the trained image by the autoencoder obeys the Gaussian distribution, the 85% quantile value of the Gaussian distribution can be used as the preset reconstruction error measurement threshold.

The determining module 402 determines whether the image to be detected has defects based on a defect criteria for filtering out small noise reconstruction errors.

In one embodiment, the determining module 402 calculates the reconstruction error image according to the reconstructed image and the image to be detected. The determining module 402 calculates a binary image of the reconstruction error image according to a binary image calculation formula for filtering out small noise reconstruction errors. In one embodiment, the binary image calculation formula can be $$\delta X_{i,j} = \begin{cases} 1 & \Delta X_{i,j} > \varepsilon \\ 0 & \text{otherwise} \end{cases},$$

wherein $\varepsilon$ is a filtering threshold of small noise reconstruction error, and $\varepsilon$ is determined by the autoencoder calculating the reconstruction error of the images in the training set, and $\varepsilon$ is used to filter out pixels with the small reconstruction error. $\Delta X_{i,j}$ is the reconstruction error image between the image to be detected and the reconstructed image, i and j represent pixel positions, and $\delta X_{i,j}$ is the binary image of the reconstruction error image. $\delta X_{i,j}$ is used to indicates the position of pixel with the larger reconstruction error. The determining module 402 calculates an average value of the pixels with the large reconstruction error, and takes the average value of the pixels with the large reconstruction error as a measurement of the defect criteria according to the reconstruction error image and the binary image.

In one embodiment, the determining module 402 detects defects of the image to be detected by the defect criteria for filtering out small noise reconstruction errors. In one embodiment, a mathematical expression of the defect criteria can be $$\frac{\sum_{i,j} \Delta X_{i,j} * \delta X_{i,j}}{\sum_{i,j} \delta X_{i,j}} > \tau.$$

In one embodiment, if the image to be detected complies with the defect criterion of filtering out small noise reconstruction error, the determining module 402 determines that the image to be detected has defects. If the image to be detected does not comply with the defect criterion, the determining module 402 determines that the image to be detected to be determined to have no defects.

If the image to be detected has defects, the classification module 403 calculates a number of structural similarity values between the image to be detected and a number of template images marking defect categories, determining a target defect category corresponding to the template image with the highest structural similarity value, and classifying the image to be detected into the target defect category.

In one embodiment, the classification module 403 calculates the structural similarity values between the image to be detected and the number of template images marking defect categories according to $SSIM(x,y)=[l(x,y)]^\alpha [c(x,y)]^\beta [s(x,y)]^\gamma$, wherein $$l(x, y) = \frac{2\mu_x\mu_y + C_1}{\mu_x^2 + \mu_y^2 + C_1}, c(x, y) = \frac{2\sigma_x\sigma_y + C_2}{\sigma_x^2 + \sigma_y^2 + C_2}, s(x, y) = \frac{2\sigma_{xy} + C_3}{\sigma_x\sigma_y + C_3},$$

where x is the image to be detected, y is the template image, and SSIM(x,y) is the structural similarity values between the image to be detected and the template image. l(x,y) is used to compare a brightness of x with a brightness of y, $\mu_x$, $\mu_y$ represent an image mean of x and an image mean of y, and c(x,y) is used to compare an image contrast of x with an image contrast of y. $\sigma_x$, $\sigma_y$ represent an image standard deviation of x and an image standard deviation of y, $\sigma_{xy}$ is an image covariance between x and y, and $C_1$, $C_2$, $C_3$ are constants, and are used to maintain stability of l(x,y), c(x,y), s(x,y).

In one embodiment, the structural similarity value of the image to be detected and the template image is positively correlated with the similarity between the image to be detected and the template image.

Figure 3:
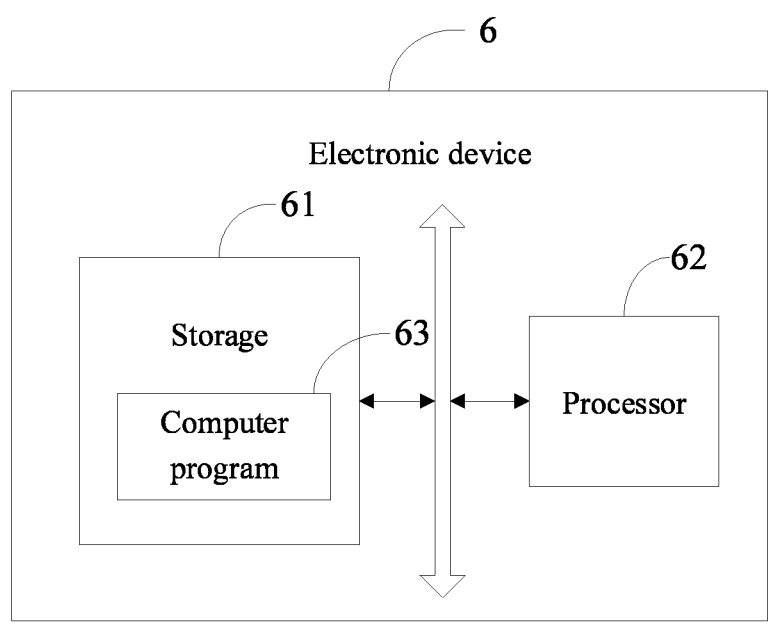
FIG. 3 is a schematic diagram of one embodiment of an electronic device using the method of FIG. 1.

FIG. 3 illustrates the electronic device 6. The electronic device 6 includes a storage 61, a processor 62, and a computer program 63 stored in the storage 61 and executed by the processor 62. When the processor 62 executes the computer program 63. the method blocks are implemented, for example, blocks 11 to 13 as shown in FIG. 1. Alternatively, when the processor 62 executes the computer program 63, the functions of the modules in the embodiment of the device 40 are implemented, for example, modules 401-403 shown in FIG. 2.

In one embodiment, the computer program 63 can be partitioned into one or more modules/units that are stored in the memory 20 and executed by the processor 62. The one or more modules/units may be a series of computer program instruction segments capable of performing a particular function, and the instruction segments describe the execution of the computer program 63 in the electronic device 6. For example, the computer program 63 can be divided into the image reconstruction module 401, the determining module 402, and the classification module 403 as shown in FIG. 2.

In one embodiment, the electronic device 6 can be a computing device such as a desktop computer, a notebook, a handheld computer, and a cloud terminal device. FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules, or units stored in the storage 61 and calling up the data stored in the storage 61.

In one embodiment, the storage 61 may mainly include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include random access memory, and may also include a non-volatile memory, such as a hard disk, an internal memory, a plug-in hard disk, a smart media card (SMC), a secure digital (SD) card, a flash card, at least one disk storage device, a flash memory device, or other volatile solid state storage device In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for detecting and classifying defects comprising:
    inputting an image to be detected to a trained autoencoder, and obtaining a reconstructed image corresponding to the image to be detected;
    determining whether the image to be detected has defects based on a defect criteria for filtering out small noise reconstruction errors;
    in response that the image to be detected has defects, calculating a plurality of structural similarity values between the image to be detected and a plurality of template images marking defect categories respectively;
    determining a target defect category corresponding to the template image with the highest structural similarity value, and classifying the image to be detected into the target defect category, wherein a mathematical expression of the defect criteria is $$\frac{\sum_{i,j} \Delta X_{i,j} * \delta X_{i,j}}{\sum_{i,j} \delta X_{i,j}} > \tau,$$

wherein $\Delta X_{i,j}$ is a reconstruction error image between the image to be detected and the reconstructed image, $\delta X_{i,j}$ is a binary image of the reconstruction error image, i and j represent pixel positions, $\tau$ is a preset reconstruction error measurement threshold.

2. The method for detecting and classifying defects as recited in claim 1, wherein $\tau$ is a statistical value of a reconstruction error corresponding to a reconstructed error image between the image and the reconstructed image, and the $\tau$ is adjusted based on a recall rate of a preset defect detection and an accuracy rate of the preset defect detection, the accuracy rate is a number of the images correctly detected as defective as a proportion of a number of all images detected as defective, and the recall rate is the number of the images correctly detected as defective as a proportion of the number of all images showing real defects.

3. The method for detecting and classifying defects as recited in claim 1, wherein a binary image calculation formula of the binary image is $$\delta X_{i,j} = \begin{cases} 1 & \Delta X_{i,j} > \varepsilon \\ 0 & \text{otherwise} \end{cases},$$

$\varepsilon$ is a filtering threshold of small noise reconstruction error.

4. The method for detecting and classifying defects as recited in claim 1, further comprising:
    training the autoencoder by an optimization objective function, wherein the optimization objective function is $|X-X'|_1 + \lambda |X-X'|_2$, wherein X is the image to be detected, X' is the reconstructed image, $\lambda$ is a weight with a value range of 0.1-10, $|X-X'|_1$ is an L1 norm of a reconstructed error image between the image and the reconstructed image, and $|X-X'|_2$ is L2 norm of the reconstruction error image.

5. The method for detecting and classifying defects as recited in claim 1, further comprising:
    calculating the structural similarity values between the image to be detected and the number of template images marking defect categories respectively according to $SSIM(x,y)=[l(x,y)]^\alpha [c(x,y)]^\beta [s(x,y)]^\gamma$, wherein, $$l(x,y) = \frac{2\mu_x \mu_y + C_1}{\mu_x^2 + \mu_y^2 + C_1}, c(x,y) = \frac{2\sigma_x \sigma_y + C_2}{\sigma_x^2 + \sigma_y^2 + C_2}, s(x,y) = \frac{2\sigma_{xy} + C_3}{\sigma_x \sigma_y + C_3},$$

x is the image to be detected, y is the template image, and SSIM(x,y) is the structural similarity values between the image to be detected and the template image, l(x,y) is used to compare a brightness of x with a brightness of y, $\mu_x$, $\mu_y$ represent an image mean of x and an image mean of y, and c(x,y) is used to compare an image contrast of x with an image contrast of y, $\sigma_x$, $\sigma_y$ represent an image standard deviation of x and an image standard deviation of y, $\sigma_{xy}$ is an image covariance between x and y, $C_1$, $C_2$, $C_3$ are constants.

6. The method for detecting and classifying defects as recited in claim 1, wherein the structural similarity value of the image to be detected and the template image is positively correlated with the similarity between the image to be detected and the template image.

7. The method for detecting and classifying defects as recited in claim 1, further comprising:
  in response that the image to be detected complies with a defect criterion of filtering out small noise reconstruction error, determining that the image to be detected has defects;
  in response that the image to be detected does not comply with the defect judgment criterion, determining that the image to be detected to be determined to have no defect.

8. An electronic device comprising:
a processor; and
a non-transitory storage medium coupled to the processor and configured to store a plurality of instructions, which cause the processor to:
  input an image to be detected to a trained autoencoder to obtain a reconstructed image corresponding to the image to be detected;
  determine whether the image to be detected has defects based on a defect criteria for filtering out small noise reconstruction errors;
  in response that the image to be detected has defects, calculate a plurality of structural similarity values between the image to be detected and a plurality of template images marking defect categories respectively;
  determine a target defect category corresponding to the template image with the highest structural similarity value, and classifying the image to be detected into the target defect category, wherein a mathematical expression of the defect criteria is $$\frac{\sum_{i,j} \Delta X_{i,j} * \delta X_{i,j}}{\sum_{i,j} \delta X_{i,j}} > \tau,$$

wherein $\Delta X_{i,j}$ is a reconstruction error image between the image to be detected and the reconstructed image, $\delta X_{i,j}$ is a binary image of the reconstruction error image, i and j represent pixel positions, $\tau$ is a preset reconstruction error measurement threshold.

9. The electronic device as recited in claim 8, wherein $\tau$ is a statistical value of a reconstruction error corresponding to a reconstructed error image between the image and the reconstructed image, and the t is adjusted based on a recall rate of a preset defect detection and an accuracy rate of the preset defect detection, the accuracy rate is a number of the images correctly detected as defective as a proportion of the number of all images detected as defective, and the recall rate is the number of the images correctly detected as defective as a proportion of the number of all images showing real defects.

10. The electronic device as recited in claim 8, wherein a binary image calculation formula of the binary image is $$\delta X_{i,j} = \begin{cases} 1 & \Delta X_{i,j} > \varepsilon \\ 0 & \text{otherwise} \end{cases},$$

$\varepsilon$ is a filtering threshold of small noise reconstruction error.

11. The electronic device as recited in claim 8, wherein the plurality of instructions are further configured to cause the processor to:
  train the autoencoder by an optimization objective function, wherein the optimization objective function is $|X-X'|_1 + \lambda|X-X'|_2$, wherein X is the image to be detected, X' is the reconstructed image, $\lambda$ is a weight with a value range of 0.1-10, $|X-X'|_1$ is an L1 norm of a reconstructed error image between the image and the reconstructed image, and $|X-X'|_2$ is L2 norm of the reconstruction error image.

12. The electronic device as recited in claim 8, wherein the plurality of instructions are further configured to cause the processor to:
  calculate the structural similarity values between the image to be detected and the number of template images marking defect categories respectively according to SSIM $(x,y) = [l(x,y)]^\alpha [c(x,y)]^\beta [s(x,y)]^\gamma$, wherein, $$l(x,y) = \frac{2\mu_x\mu_y + C_1}{\mu_x^2 + \mu_y^2 + C_1}, c(x,y) = \frac{2\sigma_x\sigma_y + C_2}{\sigma_x^2 + \sigma_y^2 + C_2}, s(x,y) = \frac{2\sigma_{xy} + C_3}{\sigma_x\sigma_y + C_3},$$

x is the image to be detected, y is the template image, and SSIM(x,y) is the structural similarity values between the image to be detected and the template image, l(x,y) is used to compare a brightness of x with a brightness of y, $\mu_x$, $\mu_y$ represent an image mean of x and an image mean of y, c(x,y) is used to compare an image contrast of x with an image contrast of y, $\sigma_x$, $\sigma_y$ represent an image standard deviation of x and an image standard deviation of y, $\sigma_{xy}$ is an image covariance between x and y, $C_1$, $C_2$, $C_3$ are constants.

13. The electronic device as recited in claim 8, wherein the structural similarity value of the image to be detected and the template image is positively correlated with the similarity between the image to be detected and the template image.

14. The electronic device as recited in claim 8, wherein the plurality of instructions are further configured to cause the processor to:
  in response that the image to be detected complies with a defect criterion of filtering out small noise reconstruction error, determine that the image to be detected has defects;
  in response that the image to be detected doesn't comply with the defect judgment criterion, determine that the image to be detected to be determined to have no defect.

15. A non-transitory storage medium having stored thereon instructions that, when executed by at least one processor of an electronic device, causes the least one processor to execute instructions of a method for detecting and classifying defects, the method comprising:
  inputting an image to be detected to a trained autoencoder to obtain a reconstructed image corresponding to the image to be detected;

determining whether the image to be detected has defects based on a defect criteria for filtering out small noise reconstruction errors;

in response that the image to be detected has defects, calculating a plurality of structural similarity values between the image to be detected and a plurality of template images marking defect categories respectively;

determining a target defect category corresponding to the template image with the highest structural similarity value, and classifying the image to be detected into the target defect category, wherein a mathematical expression of the defect criteria is $$\frac{\sum_{i,j} \Delta X_{i,j} * \delta X_{i,j}}{\sum_{i,j} \delta X_{i,j}} > \tau,$$

wherein $\Delta X_{i,j}$ is a reconstruction error image between the image to be detected and the reconstructed image, $\delta X_{i,j}$ is a binary image of the reconstruction error image, i and j represent pixel positions, $\tau$ is a preset reconstruction error measurement threshold.

16. The non-transitory storage medium as recited in claim 15, wherein $\tau$ is a statistical value of a reconstruction error corresponding to a reconstructed error image between the image and the reconstructed image, and the t is adjusted based on a recall rate of a preset defect detection and an accuracy rate of the preset defect detection, the accuracy rate is a number of the images correctly detected as defective as a proportion of the number of all images detected as defective, and the recall rate is the number of the images correctly detected as defective as a proportion of the number of all images showing real defects.

17. The non-transitory storage medium as recited in claim 15, wherein a binary image calculation formula of the binary image is $$\delta X_{i,j} = \begin{cases} 1 & \Delta X_{i,j} > \varepsilon \\ 0 & \text{otherwise} \end{cases},$$

$\varepsilon$ is a filtering threshold of small noise reconstruction error.

* * * * *